United States Patent Office 2,916,472
Patented Dec. 8, 1959

2,916,472
CROSS-LINKED PLASTICS OF HIGH MOLECULAR WEIGHT AND PROCESS FOR PRODUCING SAME

Günther Nischk, Leverkusen, and Hans Holtschmidt, Koln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application June 29, 1955
Serial No. 518,942

Claims priority, application Germany June 29, 1954

5 Claims. (Cl. 260—45.4)

This invention relates to cross-linked plastics of high molecular weight, compositions for use in the production of such products, and to a process for producing same.

More specifically, this invention relates to cross-linked plastics of high molecular weight which are produced by a process involving the reaction of hydroxyl polyesters with diisocyanates.

Broadly stated, the present invention provides novel compositions of matter and a process for their production which comprises mixing or otherwise incorporating a diisocyanate containing a urethdione grouping with a polyester containing urethane and free hydroxyl groups. The compositions thus obtained are characterized by a high degree of stability even at moderately elevated temperatures.

More specifically, the invention provides cross-linked plastics of high molecular weight and a process for their preparation which comprises heating the above novel compositions of matter to a temperature above about 80° C., preferably with simultaneous shaping.

In accordance with our copending application (Serial Number 472,230) highly elastic cross-linked plastics can be produced in two steps. In the first step, storable products of high molecular weight are obtained by reacting a mixture of a linear to predominantly linear hydroxy polyester and a glycol with a diisocyanate in such proportions that free hydroxyl groups are still present in the reaction product. In this way there is obtained an intermediate which can be worked up on a roller in the same way as rubber. In a second step, the storable product thus obtained is reacted with the same or a different diisocyanate in an amount in excess of that corresponding to the free hydroxyl groups remaining at the end of the first step.

In general, 5–10% by weight of diisocyanate, based on the weight of the storable product obtained in the first step, is used in the cross-linking reaction.

The product formed by incorporating an aromatic diisocyanate such as diphenyl methane diisocyanate or its substitution products into the intermediate still remains plastic in the cold for about 24 hours before a cross-linking takes place. The diisocyanate is preferably incorporated into the intermediate by rolling.

In accordance with this invention, it has been discovered that the storage capacity of the intermediate products containing the added aromatic diisocyanate can be extended to 4 weeks, if the diisocyanate is replaced by a urethdione group containing diisocyanate of the following general formula:

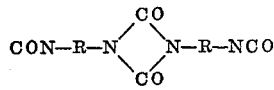

In the general formula, R represents an aromatic radical which may be substituted by lower alkyl, and alkoxy groups containing 1–5 carbon atoms, or by halogen.

Such urethdiones are known and are produced by dimerisation of aromatic diisocyanates, such as 1,2,4-toluylene diisocyanate, in the presence of organic bases such as pyridine (W. Siefken, Annalen 562, 75 (1949)).

The hydroxy polyesters preferably used as the starting materials in the process of the present invention are most expediently prepared from substantially saturated aliphatic products. Suitable acid components include malonic acid, succinic acid, adipic acid, carbonic acid, dihydromuconic acid, maleic acid, thio-dipropionic acid, sebacic acid and other dicarboxylic acids. Suitable alcohol components include ethylene glycol, 1,2-propylene glycol, 1,3-butylene glycol, 1,4-butylene glycol, 1,6-hexanediol, 1,4-butenediol, diethylene glycol and thiodiglycol. Hydroxycarboxylic acids may likewise be employed in the preparation of the polyesters, provided the dihydric alcohol is present in sufficient amounts to ensure the formation of terminal hydroxyl groups. Moreover, it is possible to use mixtures of different acids and dihydric alcohols, in which case mixed polyesters are obtained.

Other bifunctional reactants may also be used in relatively small quantities in place of the acids and alcohols. Examples of these are compounds which contain aromatic nuclei, such as phthalic acid or terephthalic acid, aromatic or aliphatic diamines, such as phenylene diamines, piperazine, ethylene diamine, and also amino alcohols, such as, for example, hydroxy-ethyl aniline and aminopropanol.

The polycondensation of the reactants is carried out by heating at 100–250° C. By using a small excess of dihydric alcohol and a sufficiently long heating period polyesters having substantially zero acid numbers are obtained. If possible, the OH number should be between 20 and 80 and preferably between 40 and 60. Before reacting them with diisocyanates, the polyesters prepared in this manner must be freed from any moisture which adheres to them under these conditions.

Among the glycols which are mixed with the hydroxy polyester in the process of the invention are, for example, aliphatic glycols, such as butylene glycol, diglycol, thiodiglycol and hexanediol; urea glycols, such as bis-hydroxyethyl urea; urethane glycols, such as the reaction products of 2 mols of butylene glycol with 1 mol of hexamethylene diisocyanate; amide glycols such as bis-hydroxyethyl-adipic acid diamide; cycloaliphatic glycols, such as quinitol; and glycols containing ester groups. Depending upon the properties desired in the cross-linked plastic different amounts of the glycol are mixed with the hydroxy polyester. Broadly speaking, about 1 to about 30%, preferably about 1 to about 10% by weight of glycol, based on the weight of the polyester, has proven to be particularly suitable for obtaining valuable plastics.

p-Phenylene diisocyanate, 1,5-naphthylene diisocyanate 1,2,4-toluylene diisocyanate, 1,2,6-toluylene diisocyanate and a technical mixture thereof are diisocyanates particularly suitable for carrying out the initial reaction. These diisocyanates are reacted with a mixture containing a hydroxy polyester and glycol in such proportions that the reaction product has a hydroxyl number of at least 5 and preferably of 10 to 25.

The products obtained from the initial reaction are soluble in glycol monomethylether acetate and are capable of being worked up satisfactorily on a roller without the additon of auxiliary agents. Completely smooth films are formed which can be stored without modification and/or cross-linking. These products are reacted at a later stage with an amount of an urethdione diisocyanate in excess of the hydroxyl groups still present. In this reaction, which preferably takes place on a roller, no cross-linking of the thermoplastic material takes place, even at moderately elevated temperature. It is only when the material is shaped while heating that cross-linking occurs and brings about the formation of a high-grade elastic material.

The working up of these products to form, for example, outer covers for tyres or inner tubes, may be carried out after a relatively long period of storage, particularly when urethdione diisocyanates are used, since the final cross-linking is not effected, or is only slightly effected, at room temperature by the urethdione diisocyanates. By finally heating the extruded materials at 100–180° C., highly elastic materials with very good mechanical properties are obtained.

In the working up of cross-linked plastics of high molecular weight, it is important initially to form products of high molecular weight which can be stored as long as required and are only converted into the cross-linked condition by the addition of another component. It is only under these conditions that it is possible to work up a plastic in a manner similar to rubber.

The invention is further illustrated by the following examples, the parts being by weight.

Example 1

1000 parts of an adipic acid-glycol polyester with an OH number of 60 and an acid number of 1 are dehydrated for 1 hour in vacuo at 20 mm. and 100° C. 45 parts of quinitol are then mixed therein by stirring and the temperature is allowed to drop to 100° C. After stirring well, 125 parts of p-phenylene diisocyanate are added. When a temperature of 125° C. is reached, the melt is forced out of the mixer and heated for a further 15 hours at 100° C. The storable polyester obtained in this manner is rolled out on a roller to produce a smooth sheet. For the production of the cross-linked plastic, 9 parts of a urethdione diisocyanate of the following constitution

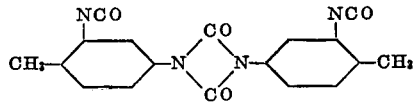

are incorporated into 100 parts of the sheet by rolling when required. The further processing to form a molded element may be carried out at a later stage using an extrusion press or a calender. The cross-linking is effected in 30 minutes at 150° C. After being stored for 24 hours at room temperature, the product is heated for a further 20 hours at 100° C. The mechanical properties of a molded plate prepared from the above product are as follows:

| | |
|---|---|
| Plate thickness | 3 mm. |
| Tensile strength | 315 kg./cm.² |
| Permanent elongation | 13%. |
| Breaking elongation | 595%. |
| Loading at 20% | 4 kg./cm.² |
| Loading at 300% | 35 kg./cm.² |
| Structure ring test (4 mm. plate) | 37 kg. absolute. |
| Elasticity | 46%. |
| Shore hardness | 79. |
| Structure fan test | 35 kg./cm.² |
| Resistance to needle scratch | 99 kg./cm. |

If 10 parts of the urethdione diisocyanate are incorporated in 100 parts of sheet by rolling and if the further processing is carried out as above described, the following mechanical values are produced:

| | |
|---|---|
| Plate thickness | 2.9 mm. |
| Tensile strength | 288 kg./cm.² |
| Permanent elongation | 11%. |
| Breaking elongation | 625%. |
| Shore hardness | 78. |
| Elasticity | 45%. |
| Loading at 20% | 3 kg./cm.² |
| Loading at 300% | 33 kg./cm.² |
| Structure ring test (4 mm. plate) | 33 kg. absolute. |
| Structure fan test | 44 kg./cm.² |
| Resistance to needle scratch | 100 kg./cm. |

Example 2

1000 parts of a polyester of adipic acid, ethylene glycol and 1,2-propylene glycol with an OH number of 60 and an acid number of 1 are dehydrated for 1 hour in vacuo at 20 mm. and 100° C. 45 parts of quinitol are then stirred in and the temperature is allowed to drop to 100° C. After stirring well, 125 parts of p-phenylene diisocyanate are added. When the temperature of 125° C. is reached, the melt is forced out of the mixer and heating is continued for a further 15 hours at 100° C. The storable polyester thus obtained is rolled out on a roller to a smooth sheet.

In order to produce the cross-linked plastic, 11 parts of the urethdione diisocyanate of the following constitution

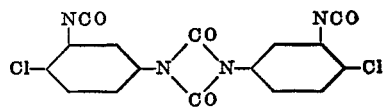

are incorporated in 100 parts of the sheet by rolling when required. The further processing to form a molded element may be carried out at a later stage by using an extrusion press or a calender. The cross-linking is effected in 30 minutes at 150° C. After being stored at room temperature, the product is heated again for 20 hours at 100° C.

Example 3

1000 parts of an adipic acid-diethylene glycol polyester with an OH number of 50 and an acid number of 1 are dehydrated in vacuo at 200 mm. and 100° C. 45 parts of quinitol are then added while stirring and 119 parts of p-phenylene diisocyanate are incorporated at 100° C.

The working up of the storable polyester is carried out as in Example 1.

In order to produce the cross-linked plastic, 12 parts of the urethdione diisocyanate of the following constitution:

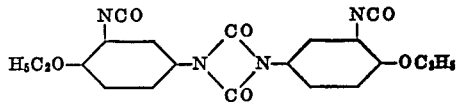

are incorporated by rolling when required in 100 parts of the rolled sheet obtained. The further processing to form a molded element may also be carried out at a later stage by means of an extrusion press or calender. After being stored for 24 hours at room temperature, the product is heated again for 20 hours at 100° C.

Example 4

1000 parts of an adipic acid ethylene glycol polyester of OH number 63 and acid number 1.5 is dehydrated for 30 minutes in vacuo at 14 mm. and 100° C. and then 20 parts of 1,4-butylene glycol is added while stirring. After stirring well, 135 parts of 1,5-naphthylene diisocyanate is added at 110° C. and during the resulting reaction, the temperature rises to 125° C. The temperature is allowed to fall to 120° C., then the mixture is cast as a block, and thereafter further heated for 15 hours at 100° C. The lengthened polyester thus obtained which is soluble in glycol monomethylether acetate is thereafter rolled out on a roller in the form of a smooth film.

For the production of a cross-linked highly elastic plastic, 10 parts of an urethdione diisocyanate of the following constitution

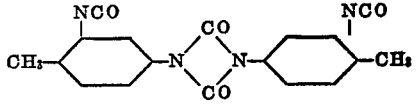

per 100 parts of the lengthened polyester is at once or subsequently incorporated by rolling and the mixture is then pressed for 30 minutes at 150° C.

The unpressed polyester containing diphenylmethane diisocyanate can be subjected to injection molding at 50-70° C. to form tubes and tyre outer covers.

What is claimed is:

1. In the preparation of an elastomeric substantially non-porous polyurethane by a process which comprises reacting an organic diisocyanate with a polyester and a glycol to form a storable product and then reacting this product with additional organic diisocyanate, the method of making a storable product of improved stability which comprises mixing (1) a substantially linear polyester selected from the group consisting of a polyester prepared by esterification of a dicarboxylic acid and an aliphatic glycol, and a polyester prepared by esterification of a dicarboxylic acid and a mixture of a major amount of an aliphatic glycol and a minor amount of a compound selected from the class consisting of a diamine and an amino alcohol, said polyester having an acid number of about 1 and an OH number of from about 20 to about 80 and (2) from about 1 percent to about 30 percent by weight based on the weight of the polyester of a glycol having its hydroxyl groups attached to an organic radical of less than 16 carbon atoms, said glycol being free from aromatic radicals and selected from the class consisting of aliphatic glycols and cycloaliphatic glycols, and thereafter mixing the resulting mixture under substantially anhydrous conditions with (3) an organic diisocyanate in an amount insufficient to react with all of the functional groups of the polyester and glycol, effecting chemical reaction under substantially anhydrous conditions to form a millable adduct having terminal OH groups and an hydroxyl number of at least 5, and thereafter mixing the adduct with an excess of an aromatic dimeric diisocyanate having the formula:

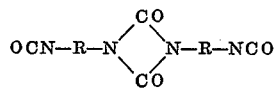

wherein R represents a divalent aromatic radical.

2. The process of claim 1 wherein the said dimeric diisocyanate is the dimer of toluylene diisocyanate.

3. The process of claim 1 wherein the glycol mixed with the polyester is quinitol.

4. A storage stable mixture of an organic polyisocyanate and the reaction product of a polyester, a glycol and an organic diisocyanate prepared by the process which comprises mixing (1) a substantially linear polyester selected from the group consisting of a polyester prepared by esterification of a dicarboxylic acid and an aliphatic glycol, and a polyester prepared by esterification of a dicarboxylic acid and a mixture of a major amount of an aliphatic glycol and a minor amount of a compound selected from the class consisting of a diamine and an amino alcohol, said polyester having an acid number of about 1 and an OH number of from about 20 to about 80 and (2) from about 1 percent to about 30 percent by weight based on the weight of the polyester of a glycol having its hydroxyl groups attached to an organic radical of less than 16 carbon atoms, said glycol being free from aromatic radicals and selected from the class consisting of aliphatic glycols and cycloaliphatic glycols, and thereafter mixing the resulting mixture under substantially anhydrous conditions with (3) an organic diisocyanate in an amount insufficient to react with all of the functional groups of the polyester and glycol, effecting chemical reaction under substantially anhydrous conditions to form a millable adduct having terminal OH groups and an hydroxyl number of at least 5, and thereafter mixing the adduct with an excess of an aromatic dimeric diisocyanate having the formula:

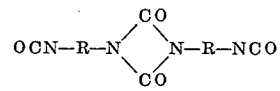

wherein R represents a divalent aromatic radical.

5. The storage stable mixture of claim 4 wherein the said dimeric diisocyanate is the dimer of toluylene diisocyanate.

References Cited in the file of this patent

UNITED STATES PATENTS

| | | |
|---|---|---|
| 2,621,166 | Schmidt et al. | Dec. 9, 1952 |
| 2,625,532 | Seeger | Jan. 13, 1953 |
| 2,625,535 | Mastin et al. | Jan. 13, 1953 |
| 2,725,366 | Seeger et al. | Nov. 29, 1955 |
| 2,729,618 | Muller et al. | Jan. 3, 1956 |
| 2,760,953 | Seeger | Aug. 28, 1956 |
| 2,777,831 | Seeger et al. | Jan. 15, 1957 |

FOREIGN PATENTS

| | | |
|---|---|---|
| 516,512 | Belgium | Jan. 15, 1953 |
| 694,978 | Great Britain | July 29, 1953 |

OTHER REFERENCES

Popper: Rubber Age (April 1953), pp. 81–83. (Copy in Scientific Library.)

Curphey: Isocyanate Elastomers, "British Plastics," October 1954, pp. 407–409. (Copy in Scientific Library.)

Fiat Final Report #1301, Supplementary Report on Applications of Diisocyanates, Joint Intelligence Objectives Agency, Washington, D.C., Sept. 15, 1947, pp. 1 and 7.